United States Patent [19]

Palfi et al.

[11] Patent Number: 4,557,875
[45] Date of Patent: Dec. 10, 1985

[54] PHASE-CONTACTING PLATE FOR A PHASE-CONTACTING COLUMN

[75] Inventors: Zoltan Palfi; Sándor Krekacs, both of Budapest, Hungary

[73] Assignee: Orszagos Koolaj es Gazipari Troszt, Budapest, Hungary

[21] Appl. No.: 691,974

[22] Filed: Jan. 16, 1985

Related U.S. Application Data

[63] Continuation-in-part of Ser. No. 444,577, Nov. 12, 1982.

[30] Foreign Application Priority Data

Mar. 15, 1982 [WO] Hungary ........................... 657
Mar. 15, 1982 [WO] PCT Intl Appl. . PCT/HU82/00011

[51] Int. Cl.$^4$ .............................................. B01F 3/04
[52] U.S. Cl. ................................ 261/75; 261/114 VT
[58] Field of Search ................ 261/114 VT, 44 R, 43, 261/75, 83

[56] References Cited

U.S. PATENT DOCUMENTS

| | | | |
|---|---|---|---|
| 3,325,255 | 6/1967 | Treybal | 422/193 |
| 3,807,711 | 4/1974 | Hirao et al. | 261/114 VT |
| 3,817,501 | 6/1974 | Tjutjunnikov et al. | 261/114 VT |
| 3,940,462 | 2/1976 | Braun et al. | 261/114 VT |
| 4,004,609 | 1/1977 | Fabry et al. | 261/114 VT |

FOREIGN PATENT DOCUMENTS

| | | | |
|---|---|---|---|
| 2115338 | 11/1971 | Fed. Rep. of Germany . | |
| 1237299 | 6/1960 | France . | |
| 67964 | 6/1970 | German Democratic Rep. . | |
| 154070 | 3/1968 | Hungary . | |
| 163343 | 7/1974 | Hungary . | |
| 483749 | 7/1970 | Japan | 261/114 VT |
| 46-14642 | 4/1971 | Japan | 261/114 VT |
| 6405943 | 5/1964 | Netherlands | 261/114 VT |
| 1461533 | 1/1977 | United Kingdom . | |
| 298337 | 4/1971 | U.S.S.R. . | |
| 286961 | 11/1971 | U.S.S.R. . | |
| 596259 | 2/1978 | U.S.S.R. | 261/114 VT |
| 747481 | 7/1980 | U.S.S.R. | 261/114 VT |

OTHER PUBLICATIONS

Chemical Engineer's Handbook, Chapter 21, pp. 21-28, McGraw-Hill Co., N.Y., N.Y., 1973.
"Valve Plates of Rectifying and Absorption Apparatus" Published by Central Research Institute for the Food Industry, Moscow 1971.

Primary Examiner—Tim Miles
Attorney, Agent, or Firm—Karl F. Ross; Herbert Dubno

[57] ABSTRACT

Phase-contacting plates are defined by a plurality of pivotable flow-blocking members arranged in alternating rows in which the respective blocking members thereof pivot in opposite direction to the respective blocking members of adjacent rows, the respective blocking members of each row overlapping successive members thereof, each blocking member being deflectable by the upward flow of the low-density phase and controlling the downward flow of the high-density phase, each flow-blocking member being formed by at least one elongated flow-blocking flap pivotable about a transverse axis at one end thereof, and at least one moment-equalizing element operatively connected with the flow-blocking flap.

11 Claims, 11 Drawing Figures

PHASE-CONTACTING PLATE FOR A PHASE-CONTACTING COLUMN

CROSS-REFERENCE TO RELATED APPLICATION

The present application is a continuation-in-part of our copending application Ser. No. 444,577, filed Nov. 12, 1982.

FIELD OF THE INVENTION

The present invention relates to a phase-contacting plate for a phase-contacting apparatus for the purpose of distillation, adsorption, extraction or the like.

BACKGROUND OF THE INVENTION

Phase-contacting apparatus is extensively used in the chemical and chemical process industry, and can be built into columns. Liquid, gas and gaseous agents of different specific weight and consisting of two or more phases are contacted in the columns, thereby ensuring reaction or interaction of the components of the various phases. One of the group of such apparatus is the so-called plate-type contactor described in British Pat. No. 1,461,533, the further development and improvement of which is a tower provided with a venting system.

In venting phase-contacting apparatus, the ascending vapor or gas opens the flow-blocking members to an extent depending on the load or pressure, until the liquid phase passes downwardly through the perforations formed in the cascade plates and through the weir of the overflow plates.

These control devices are extremely diversified. Thus for instance according to the French Pat. No. 1,237,299, they are discs or catches; according to the GFR patent No. 67,964, they are blocking plates, and a similar device is described in the GDR patent No. 2,115,338; in the arrangement in the Hungarian Pat. No. 166,433, the control devices are tilting elements with limited movement.

The common shortcoming of the prior types of apparatus is that the fundamental pressure loss is determined by the weight of the flow-blocking member, i.e. by the density and geometrical dimensions of the control unit.

This fact significantly limits the applicability or field of utilization of these apparatus. Thus, while the venting plate devices in a vacuum operation mode would be expected to be in demand, they have not gained general acceptance, or are used only to a very limited extent.

OBJECT OF THE INVENTION

The object of the present invention is the elimination of the adverse properties of the known apparatus by providing an improved apparatus which will increase efficiency in the operation of a phase-contacting column.

SUMMARY OF THE INVENTION

The invention provides a phase-contacting plate for a phase-contacting column mainly for use in the chemical or environmental protection industry, the significant feature of which is the configuration of the flow-blocking members, which are enabled to turn or pivot around centers of rotation or axes of rotation, the members being formed with a flow-blocking flap, the opening of which is controlled by the upward flow of the low-density phase and a moment-equalizing element operatively connected therewith, the element having a configuration such that it will not interfere with the low-density flow. The structural material of these members is uniform.

In one embodiment of the invention, at least one moment-equalizing element is operatively connected to several flow-blocking flaps, the flaps operating simultaneously under the control of at least one element.

According to another embodiment of the invention, the flow-blocking member comprises several flaps operatively connected with one or more equalizing elements and is provided with at least one formation allowing pivotal movement.

According to a further feature of the invention, the equalizing elements and/or blocking flaps are the units enabling pivotal movement.

In another advantageous embodiment of the invention, the equalizing element is provided with a spring force, suitably from a coil spring, torsion spring or leaf spring.

An advantage of the flow-blocking member according to the invention is that the pressure loss in the control plate can be set to a predetermined level, regardless of the density or weight of the structural material of the flow-blocking members, the members acting uniformly over a wide load range, providing for an increase in efficiency. The advantages of the plate according to the invention are most prominent in a vacuum operation mode.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 2:
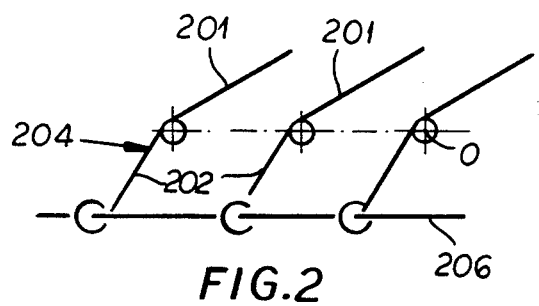
FIG. 2 is a diagrammatic side view of a portion of the phase-contacting plate according to another embodiment of the invention.
Figure 2A:
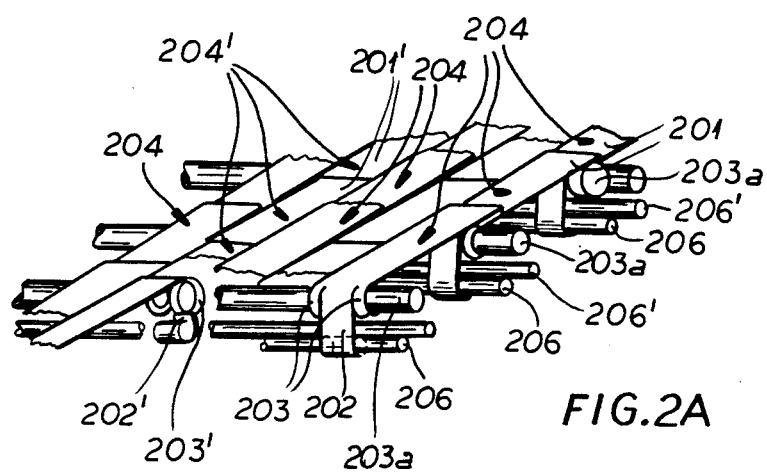
FIG. 2A is a perpective structural view of the embodiment of FIG. 2.

The phase-contacting plate according to the invention is defined by a plurality of pivotable flow-blocking members arranged in alternating rows in which the respective flow-blocking members thereof pivot in opposite direction to the respective blocking members of adjacent rows, the respective blocking members of each row overlapping successive members thereof, as can be seen with particularity in FIG. 2A of the drawing, each blocking member being deflectable by the upward flow of the low-density phase and controlling the downward flow of the high-density phase, there being several embodiments of flow-blocking members, as will be described hereinafter.

Figure 1:
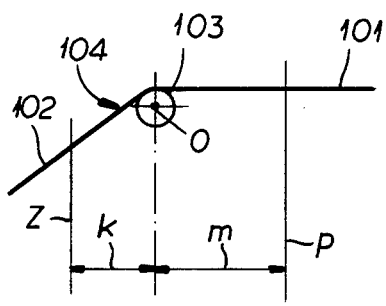
FIG. 1 is a diagrammatic side view of a flow-blocking member according to the invention.
Figure 1A:
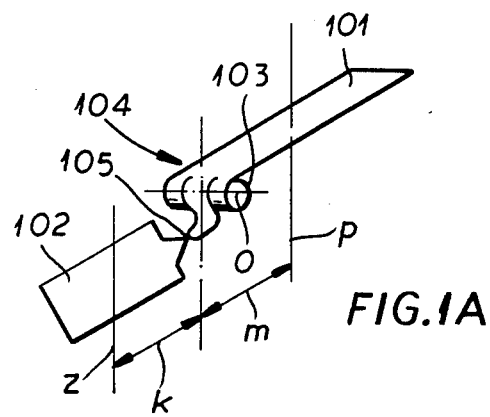
FIG. 1A is a perspective structural view of the embodiment of FIG. 1.

The flow-blocking member 104 illustrated in FIGS. 1 and 1A is formed from a single strip of metal which has been stamped to form a narrowed portion 105 which defines on either side respectively a flow-blocking flap 101 and a moment-equalizing element 102, the member 104 having been twisted at narrowed portion 105 so that element 102 lies at 90° to a transverse axis O about which member 104 is pivotable by a formation 103. The moment-equalizing element 102 has a moment arm k extending between the axis O and the force line z, while the flow-blocking flap 101 has a moment arm m extending between the axis O and the force line p, the moment arm m being greater than the moment arm k so that the flap 101 is normally in a closed position. In a phase-contacting plate defined by a plurality of these members 104, although adjacent members of respective rows will be pivotally mounted on common shafts, each member 104 will act independently of the others.

In the embodiment of FIGS. 2 and 2A, a portion of the phase-contacting plate is illustrated showing the blocking members 204 and 204' arranged in respective rows in which the members thereof pivot in an opposite direction to the members of the adjacent rows, however with adjacent members 204 and 204' being commonly pivotable on shafts 203a centered on axes O by formations 203 and 203' respectively. The members 204 are formed with flaps 201 and moment elements 202, the elements 202 of members 204 in alternating rows in the same line being ganged by rods 206, so that all members 204 in a line in alternating rows will pivot together on the common shafts 203a, just as members 204' formed with flaps 201' and moment elements 202' ganged by rods 206' do, whereby simultaneous opening and closing of the respective flaps 201 in a row is achieved, as is the respective opening and closing of respective flaps 201' in a row, whereby assembly of the phase-contacting plate is greatly simplified.

Figure 3:
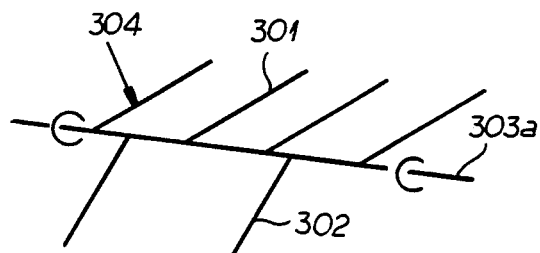
FIG. 3 is a diagrammatic side view similar to FIG. 2 showing another embodiment of the invention.
Figure 3A:
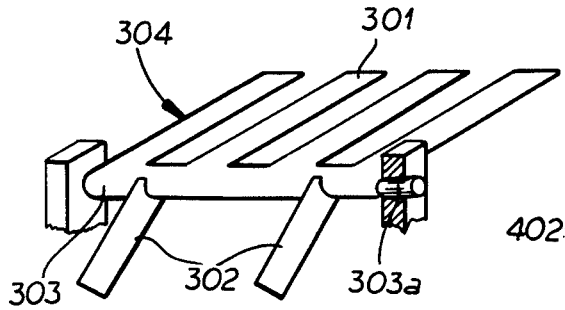
FIG. 3A is a perpective structural view of the embodiment of FIG. 3.

The embodiment of FIGS. 3 and 3A illustrates an even more simplified version of FIGS. 2 and 2A, in which the flow-blocking member 304 is formed with several flaps 301 stamped from a single sheet and provided with the formation 303 pivotally engaging the shaft 303a, and a pair of moment elements 302 counterbalancing the flaps 301, which are greater in number. The member 304 is interdigitated with an identical member pivoting in the opposite direction (not illustrated).

Figure 4:
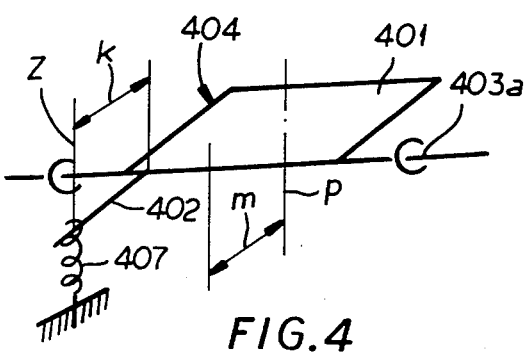
FIG. 4 is a diagrammatic side view similar to FIG. 2 showing yet another embodiment of the invention.
Figure 4A:
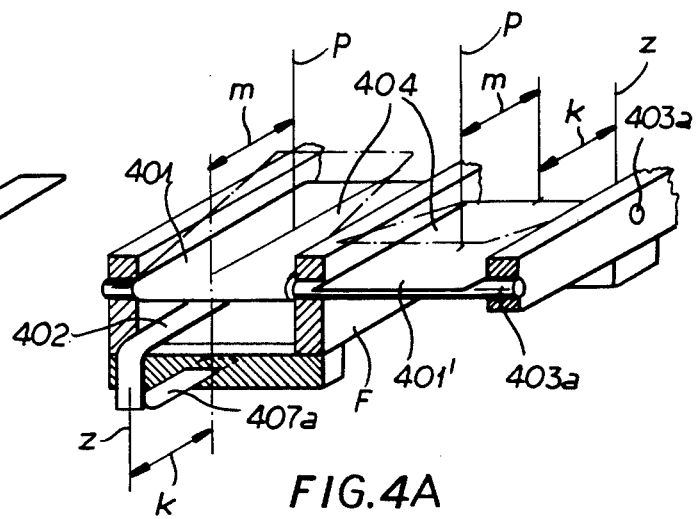
FIG. 4A is a perpective structural view of the embodiment of FIG. 4.

In the embodiments of FIGS. 4 and 4A, the blocking members 404 are pivotally seated in frame F on the shafts 403a with the respective flaps 401 and 401' pivoting in opposite direction, as shown in phantom lines, the moment element 402 being spring loaded by either a coil spring 407, as shown in FIG. 4, or a leaf spring 407a as shown in FIG. 4A, the advantage being that the spring-loaded element 402 can be made smaller and thus occupy less space, the force line z acting along the spring.

Figure 5:
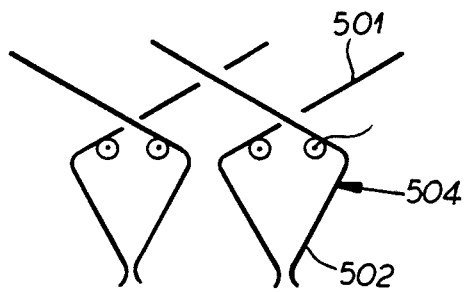
FIG. 5 is a diagrammatic side view similar to FIG. 1 showing another flow-blocking member according to the invention.

In the embodiment of FIG. 5, which has been illustrated only in diagrammatic form, the blocking members 504 have a particular curve whereby the moment elements 502 of adjacent oppositely opening members abut one another at a point limiting the opening of the flaps 501, thereby eliminating the need for any extraneous stop for regulating the extent of flap opening.

Figure 6A:
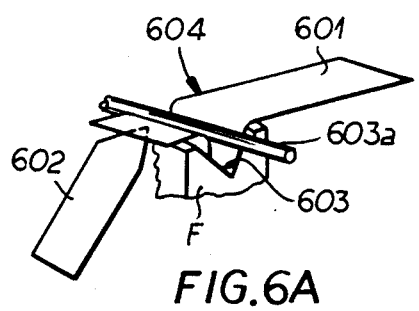
FIG. 6A is a perspective structural view of the embodiment of FIG. 6.
Figure 6:
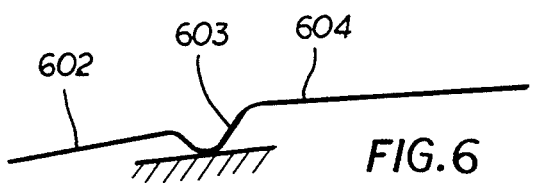
FIG. 6 is a diagrammatic side view similar to FIG. 1 showing yet another flow-blocking member according to the invention.

In the embodiment of FIGS. 6 and 6A, the blocking member 604 has a flap 601 provided with a U-shaped formation 603 seated in a V-shaped groove formed in the frame F, whereby the member 604 can pivot or rock, the shaft 603a being disposed in the formation 603 for preventing the member 604 from becoming unseated. In this embodiment, the moment element 602 is once again arranged at 90° to the transverse axis O. This particular embodiment is used to advantage in the case where the high-density phase contains pollution agents which would ordinarily deposit in the formations about which pivoting takes place and possibly cause jamming of the blocking member, however the particularly loose fitting of formation 603 in the groove of the embodiment prevents this from happening.

It should be pointed out that the regulating feature described for the embodiment of FIG. 5 can also be found in the embodiment illustrated in FIG. 2A, in which the ganging rods 206 and 206' will abut at a certain point limiting the extent to which the flaps 201 and 201' can open. These two Figures also illustrate with particularity the overlapping feature of successive blocking members in a respective row.

It can be seen from the foregoing that one of the advantages of the present invention is that pressure losses are very low, so that the phase-contacting plate is particularly applicable to vacuum operated apparatus and in the presence of corrosive-aggressive agents.

The formation of the moment arm allows operation of the cascade-type of column to the full cross section, since the uniformly distributed fluid dribbling down from each moment element intensively participates in the transfer of material and makes the use of separate liquid distributors unnecessary and allows reduced dimensioning of the phase-contacting plate.

A further advantage of the invention is that the blocking members are fabricated from metal strips or wire and bent into shape, thereby being simple to make and assemble, whereby costs are kept low.

The preferable field of application of the invention is in gas or vapor/liquid phase-contacting operations, liquid/liquid phase contacting, and for the treatment of agents in gaseous or vapor states containing a solid phase, for instance for removing dust from air, whereby the invention becomes applicable in environmental protection operations.

We claim:
1. In a phase-contacting column in which a low-density phase is passed upwardly into intimate contact with a high-density phase and the column is formed with a multiplicity of phase-contacting plates permitting upward flow of the low-density phase and downward flow of the high-density phase therethrough, the improvement wherein each of said plates is defined by a plurality of pivotable flow-blocking members arranged in alternating rows in which the respective flow-blocking members thereof pivot in opposite direction to the respective blocking members of adjacent rows, the respective blocking members of each row overlapping successive members thereof, each blocking member being deflectable by the upward flow of the low-density phase and controlling the downward flow of the high-density phase, each flow-blocking member comprising:
at least one elongated flow-blocking flat flap pivotable about a transverse axis at one end thereof, and at least one moment-equalizing element operatively connected with said flow-blocking flap for balancing at least part of the weight thereof about said axis, said flaps together forming a surface of a respective plate supporting said high-density phase.

2. The improvement defined in claim 1 wherein at least one moment-equalizing element is integral with at least one flow-blocking flap.

3. The improvement defined in claim 1 wherein a plurality of said flow-blocking flaps are mounted for pivotal movement in common about said axis.

4. The improvement defined in claim 3 wherein at least one moment-equalizing element is operatively connected with all of said flow-blocking flaps of said plurality.

5. The improvement defined in claim 4 wherein all of said flaps of said plurality and said element operatively connected thereto are integral with each other and composed of the same material.

6. The improvement defined in claim 1 wherein each of said flow-blocking members includes a formation about which said member can pivot.

7. The improvement defined in claim 6 wherein said formation includes means enabling intrinsic deformation of said flow-blocking members.

8. The improvement defined in claim 1, further comprising spring means connected to said moment-equalizing element.

9. The improvement defined in claim 8 wherein said spring means is a leaf spring.

10. The improvement defined in claim 8 wherein said spring means is a coil spring.

11. The improvement defined in claim 1 wherein said moment-equalizing element is a strip arranged at 90° to said transverse axis.

* * * * *